US008018879B2

(12) United States Patent
Li (10) Patent No.: US 8,018,879 B2
(45) Date of Patent: Sep. 13, 2011

(54) WIRELESS TRANSMISSION METHOD OF USING EFFICIENT HIGH PERFORMANCE FRAME STRUCTURE IN WIDEBAND TDD SYSTEM (75) Inventor: Shihe Li, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 804 days.

(21) Appl. No.: 11/886,193

(22) PCT Filed: Dec. 29, 2005

(86) PCT No.: PCT/CN2005/002353
§ 371 (c)(1),
(2), (4) Date: May 1, 2008

(87) PCT Pub. No.: WO2006/094442
PCT Pub. Date: Sep. 14, 2006

(65) Prior Publication Data
US 2008/0240002 A1 Oct. 2, 2008

(30) Foreign Application Priority Data

Mar. 11, 2005 (CN) .......................... 2005 1 0053780

(51) Int. Cl.
*H04J 3/00* (2006.01)
(52) U.S. Cl. ...................................... 370/280
(58) Field of Classification Search .................. 370/252, 370/277, 280, 294, 345, 229, 235, 276; 455/91, 455/106, 108, 110; 375/295, 298, 300, 302
See application file for complete search history.

(56) References Cited

U.S. PATENT DOCUMENTS 5,732,076 A * 3/1998 Ketseoglou et al. .......... 370/347
(Continued)

FOREIGN PATENT DOCUMENTS

CN 1229547 A 9/1999
(Continued)

OTHER PUBLICATIONS

Li Shihe, "Method of raising transmission speed in multi-slot CDMA radio communication system" Oct. 20, 2004, esp@cenet, pp. 1-16.*

*Primary Examiner* — Derrick W Ferris
*Assistant Examiner* — Omar Ghowrwal
(74) *Attorney, Agent, or Firm* — Merchant & Gould P.C.

(57) ABSTRACT

The present invention provides a method of wireless transmission using a high-efficiency and high-performance frame structure used by the broadband TDD system, wherein the method includes: dividing a sub-frame with a fixed length into N+1 basic slots and three special slots, wherein one basic slot is used to transmit broadcast or paging information of a cell and N basic slots are used to transmit service information in the downlink and uplink; combining several basic slots in the N basic slots to a spreading slot when a transmitting rate of a single slot needs to be improved and using the spreading slot to transmit and spread high rate services with a matching slot length. The present invention proposes a developing direction for the TDD system in the beyond 3G. With this frame structure to perform the wireless transmission, services at different data rates can be provided and the ability of transmitting at different rates up to 100 Mbps when the system bandwidth is 5 MHz, 10 MHz or 20 MHz respectively only by changing the length of the slot, combining basic slots into different multiples of spreading slots, adopting different modulation mode and spreading coefficient.

8 Claims, 4 Drawing Sheets

U.S. PATENT DOCUMENTS

| | | | |
|---|---|---|---|
| 6,459,700 B1 * | 10/2002 | Hoang | 370/401 |
| 6,643,469 B1 * | 11/2003 | Gfeller et al. | 398/162 |
| 2002/0193079 A1 * | 12/2002 | Nara | 455/70 |
| 2004/0002334 A1 * | 1/2004 | Lee et al. | 455/436 |
| 2004/0152478 A1 * | 8/2004 | Ruohonen et al. | 455/502 |
| 2006/0087997 A1 * | 4/2006 | Li | 370/320 |
| 2010/0067385 A1 * | 3/2010 | Liu et al. | 370/241.1 |

FOREIGN PATENT DOCUMENTS

| | | |
|---|---|---|
| CN | 1538652 A | 10/2004 |
| KR | 2002-005256 | 7/2002 |

* cited by examiner

WIRELESS TRANSMISSION METHOD OF USING EFFICIENT HIGH PERFORMANCE FRAME STRUCTURE IN WIDEBAND TDD SYSTEM

CROSS-REFERENCE TO RELATED APPLICATIONS

This application is a National Stage of International Application No. PCT/CN2005/002353, filed Dec. 29, 2005. The disclosure of the above application is incorporated herein by reference.

FIELD

The present invention relates to a broadband time division duplex (TDD) mobile communication system technology, especially to a method of wireless transmission using a high-efficiency and high-performance frame structure when a Time Division-Synchronous Code Division Multiple Access (TD-SCDMA) mobile communication system works in a broader bandwidth.

BACKGROUND

Currently there are two broad band carrier systems according to the $3^{rd}$ generation time division duplex mobile communication system standard (refer to 3GPP related standard files). One is a Universal Telecommunication Radio Access Time Division Duplex (UTRA TDD) system of high chip rate (HCR) with a rate of 3.84 Mcps and the other is a TD-SCDMA system with a low chip rate (LCR) with a rate of 1.28 Mcps. Since the TD-SCDMA system uses an smart antenna technology and has an advantage of high efficient spectrum use, the TD-SCDMA system has obtained wide recognition and will be widely used in the coming one or two years. However, in the worldwide, people has stopped developing the UTRA TDD system.

In order to meet a requirement of a high density environment, a "multiple carrier TDD mobile communication system" is adopted. In this system, a base station is designed to work for multiple carriers and the multiple carriers serve one sector or one cell. Since the TDD mobile communication system uses multiple carrier frequencies in one cell or one sector, it has advantages of a flexible spectrum usage and the same properties of uplink and downlink transmission. Therefore, it is especially adaptable for asynchronous services and will be an optimum duplex mode for the beyond 3G mobile communication systems.

Applying the TDD technology in the public mobile communication system is an innovation of the 3G mobile communication international standard. Since it is an innovative standard, it has serious defects in the wireless transmission design for the HCR UTRA TDD system and it is also imperfect for the LCR TD-SCDMA system although it uses a lot of new technologies. The obvious defects are as follows.

The wireless frame structure of the HCR UTRA TDD system is to divide 10 ms into 15 slots with very small protecting interval between slots and Since the slots are averagely allocated, a cell with a big radius cannot be supported and it is difficult to realize the synchronous CDMA; since it uses the same cell searching technology with the CDMA FDD system and doesn't take into account that the system uses the same carrier frequencies in the downlink and uplink, i.e. this kind of cell searching technology can only be used in a single cell; the frame structure of the UTRA TDD system limits the usage of new technologies such as the smart antenna in the system, leading to the low usage ratio of the spectrum; the above problems also bring the defect of high cost of the system.

Figure 1:
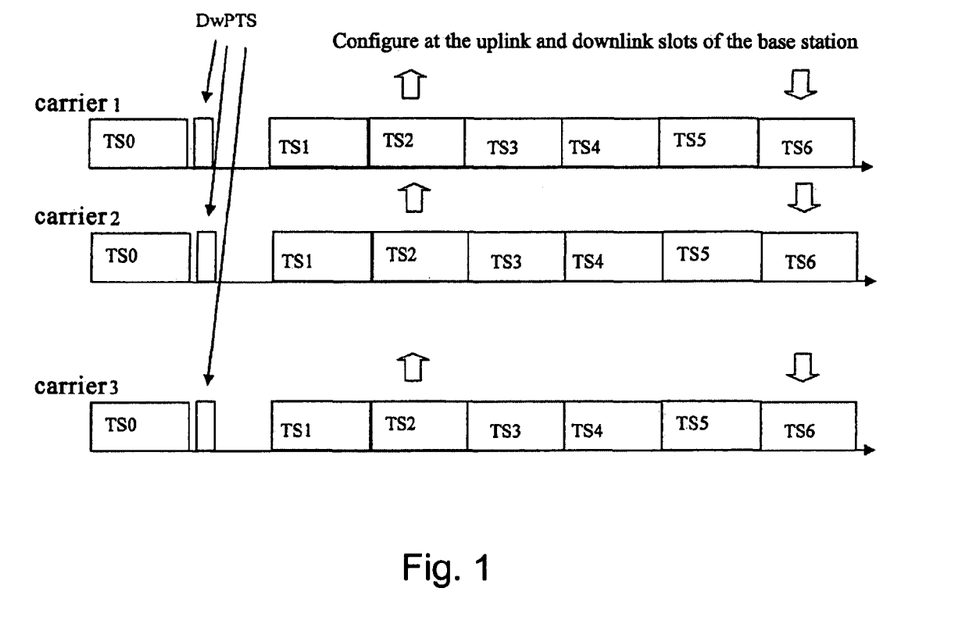
FIG. 1 is a schematic diagram showing a channel allocation of a multi-carrier base station in a 3GPP standard TDD system.

Currently, for the LCR TD-SCDMA system, China standard specifies that the CDMA TDD (LCR) mobile communication system works with multiple carriers such as carrier 1, carrier 2 and carrier 3 and the frame structure used by the base station in allocating channels is shown in FIG. 1, which is constituted by seven main slots from TS0 to TS6 and three special slots which are Downlink Pilot Time Slot (DwPTS), Uplink and Downlink Protecting Time Slot (G) and Uplink Pilot Time Slot (UpPTS) (in FIG. 1 only DwPTS is shown) and the base station is responsible for configuring the uplink and downlink slots for the main slots TS1 to TS6. Because of the LCR and limited radio resources on each carrier, when transmitting services with rates higher than 2 Mbps, the multiple carriers must be combined which leads to a complex terminal and high cost; in a mobile communication system with cellular architecture, a terminal may move to a position near 3-6 base stations. At this time, in each cell served by each carrier shown in FIG. 1, the terminal may receive different codes in the DwPTS of each carrier and the number of the codes may be the same with the number of the base station, such as 3-6 codes, which leads to the difficulty in cross cell switching for the terminal.

The common defects of the above LCR TD-SCDMA system and the HCR UTRA TDD system are that the length of the scrambling code is the same with that of the spreading code when the number of the spreading code is 16. Since if the length of the scrambling code is too short, there will be a very large peak signal power and a very bad in band amplitude and frequency characteristics, which will lead to an increase in the cost of RF components; problems related with the multiple carrier working mode in each cell and cellular networking are not fully taken into account; and transmission problems when the data transmission rate surpasses 2 Mbps are not fully taken into account.

In summary, related technologies of the TDD system in the 3G mobile communication standard need to be developed and improved so as to satisfy the requirements of the beyond 3G and further mobile communication services.

SUMMARY

Time Division Duplex is a main kind of duplex mode and is used in the 3G mobile communication systems. The present invention suggests a developing direction of the TDD system in the beyond 3G, i.e. when a carrier frequency bandwidth of each carrier is broad and a single carrier working mode or a multi-carrier working mode is realized in a cell or a sector, a method of wireless transmission using a high-efficiency and high-performance frame structure.

A technical solution to realize the objective of the present invention is a method of wireless transmission using a high-efficiency and high-performance frame structure used by the broadband TDD system, wherein by the method, one sub-frame is divided into several basic slots and several special slots and one basic slot is used to transmit broadcast or paging information of a cell and the other basic slots are used to transmit service information. The characteristic of the basic slots used to transmit service information is that they can be combined into several spreading slots to transmit services.

Further, a technical solution to realize the objective of the present invention is a method of wireless transmission using a high-efficiency and high-performance frame structure used by the broadband TDD system, wherein the method includes: dividing a sub-frame with a fixed length into N+1 basic slots and three special slots, wherein one basic slot is used to transmit broadcast or paging information of a cell and N basic slots are used to transmit service information in the downlink and uplink; combining several basic slots in the N basic slots to a spreading slot when a transmitting rate of a single slot needs to be improved and using the spreading slot to transmit and spread high rate services with a matching slot length, wherein N is an integer.

The basic slot or spreading slot includes one midamble part, which is used to transmit a link estimation value and synchronization holding information, and there is one service data area at both sides of the midamble respectively for transmitting service data and there is one interval area for protecting between the basic slots and between the spreading slots.

The interval areas between the basic slots and the interval areas between the spreading slots have the same length.

The length of each basic slot in the N+1 basic slots can be the same or different and even that the lengths of some basic slots can be the same and the lengths of the other basic slots are different.

The three special slots include a Downlink Pilot Time Slot DwPTS, an Uplink and Downlink Protecting Time Slot G and an Uplink Pilot Time Slot UpPTS.

Further, the method of the present invention includes: determining N so as to determine the length of the basic slots so as to combine the basic slots to spreading slots and to determine a modulation mode, correction coding mode and spreading coefficient used in different basic slots and spreading slots so as to provide wireless transmission for a service with different transmission rate and different transmission quality requirements.

Further, the method of the present invention includes: adjusting the spreading coefficient and the multiple of the basic slots constituting the spreading slots corresponding to some modulation mode when the N is fixed and adjusting requirements of the system for different data rate transmission abilities within 100 Mbps when the system bandwidths are 5 MHz, 10 MHz and 20 MHz respectively.

N=10 and the length of the spreading slots are 2 to 9 times of those of the basic slots.

The present invention provides a high efficient and high performance frame structure for the broadband CDMA TDD mobile communication system. A 5 ms sub-frame is divided into N+1 basic slots and three special slots. One basic slot TS0 is a downlink slot for broadcast or paging of the cell and then three special slots follow and then there are N basic slots TS1 to TSN for transmitting service information and the N basic slots can be called service slots. N is an integer. Theoretically, N can be any integer while in selecting N, it is limited such as less than 20. The length of each basic slot in the N+1 basic slots can be the same or different and they can be even combined to different spreading slots for transmitting high rate data. The N service slots can be allocated as uplink slots or downlink slots. Each basic slot or spreading slots is comprised of four parts: a midamble for link estimation and synchronization, service data areas at both sides of the midamble and a protecting interval between basic slots or between spreading slots. The protecting interval between basic slots and the protecting interval between spreading slots can have the same length but the midamble and the service data area in the basic slot have different length with those of in the spreading slots.

When using the frame structure of the present invention to transmit, services of different data rates may be provided by changing the width of the basic slot, combining basic slots into spreading slots at different multiples and using different modulation mode and spreading coefficient.

The present invention uses a high efficient and high performance frame structure for wireless transmission in the broadband CDMA TDD mobile communication system. The frame structure is similar with that in the TD-SCDMA system so it fully utilizes the basic technologies of the 3G TDD (LCR) system. With the frame structure of the present invention, the following advantages can be obtained.

Multiple bandwidths can be used, for example, the bandwidth of each carrier can be 5 MHz, 10 MHz or 20 MHz; requirements when using different new technologies can be satisfied, for example, technologies such as the Multi-input and Multi-output (MIMO) can be used in addition to the smart antenna, synchronous CDMA, joint detection, relay handover already used in the TD-SCDMA system; changeable spreading coefficient can be supported, for example, the spreading coefficient can be from 1 to 64 or to 128; changeable slot width can be supported to satisfy requirements of different uplink and downlink service ratio, for example, the uplink and downlink ratio can be 1:10 or 10:1; long scramble code can be supported, for example, the length of the scramble code is 2 to 4 times of the spreading coefficient; multiple modulation modes can be adaptively supported, for example, the modulation mode can be QPSK, 16QAM, or 64QAM; a multi-carrier working mode can be supported.

With this frame structure to perform the wireless transmission, voice services at different rates can be provided high efficiently and the transmission rate and efficiency of the data, especially of the packet switching data can be improved greatly so as to meet the requirements of the beyond 3G mobile multimedia.

The present solution is an improvement and perfection for the current TD-SCDMA system. Compared with the technical solution of the current TD-SCDMA system, the frame structure of the present invention can meet the requirements even when the future system improves its transmission rate, i.e. the frame structure of the present invention can meet the requirements of the beyond 3G high data rate transmission, overcome the defects of the current frame structure and doesn't add additional cost and complexity.

DETAILED DESCRIPTION

The present invention provides a frame structure designed for a wireless transmission in a broadband TD-SCDMA mobile communication system. With this frame structure to perform the wireless transmission, the requirements of the beyond 3G high data rate transmission can be satisfied.

Figure 2:
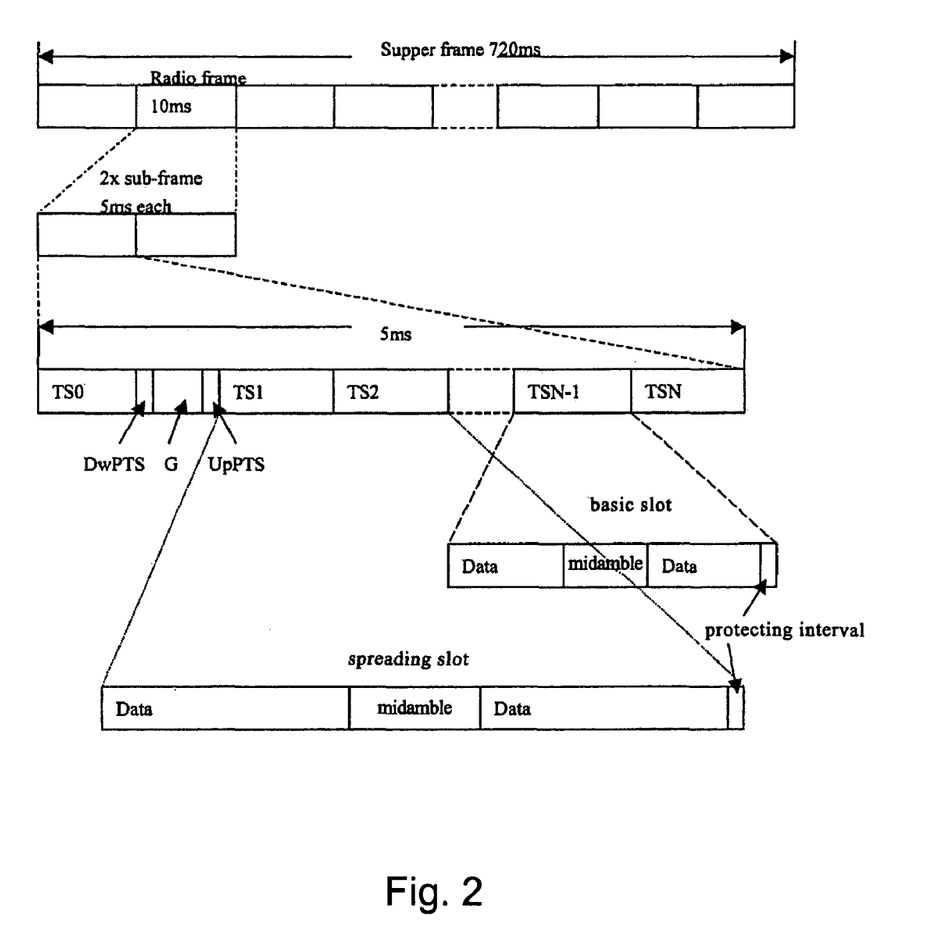
FIG. 2 is a schematic diagram showing a frame structure designed for a wireless transmission in a broadband TD-SCDMA mobile communication system.

FIG. 2 shows a frame structure of the present invention designed for a broadband TDD system. A length of one Supper frame is 720 ms, including 72 wireless frames, wherein the length of each wireless frame is 10 ms and each wireless frame is comprised of 2 sub-frames with a length of 5 ms each. Each 5 ms sub-frame is divided N+1 basic slots and 3 special slots, wherein one basic slot TS0 is a downlink slot for broadcast or paging of the cell and then 3 special slots follow which are Downlink Pilot Time Slot (DwPTS), Uplink and Downlink Protecting Time Slot (G) and Uplink Pilot Time Slot (UpPTS) and then N basic slots TS1 to TSN follow, which are used to transmit service information and can be called service slots.

The length of the N+1 basic slots can be the same or different and even that the lengths of some basic slots can be the same and the lengths of the other basic slots are different; the N basic slots can be used individually or be used together; the N basic slots can be used as the uplink slots or the downlink slots.

When transmitting high rate data, multiple (2 or more than 2) basic slots can be combined to form spreading slots with different lengths. FIG. 2 shows the basic slot TS1 and the TS2 are combined to form a spreading slot.

Each basic slot or spreading slots is comprised of four parts: a midamble for link estimation and synchronization, service data areas at both sides of the midamble for transmitting service data and a protecting interval g between basic slots or between spreading slots. When there are spreading slots, the length of the last protecting interval g following the last spreading slot can be the same with that of the protecting interval g between the basic slots, but the lengths of the midamble and of the service data area will change.

With this frame structure, when providing services at different data rates, only the length of the slot, modulation mode and spreading coefficient need to be changed. The above change or adjustment may be achieved in the way of defining software so that the system can have high flexibility. When the system is in update, if the bandwidth increases from 5 MHz to 10 MHz or 20 MHz and when the hardware platform has enough processing ability, the system can be updated by only updating software, which provides convenience for adapting to the beyond 3G development.

Then the practical application of the present invention will be illustrated with reference to FIG. 3 and FIG. 4.

Figure 3:
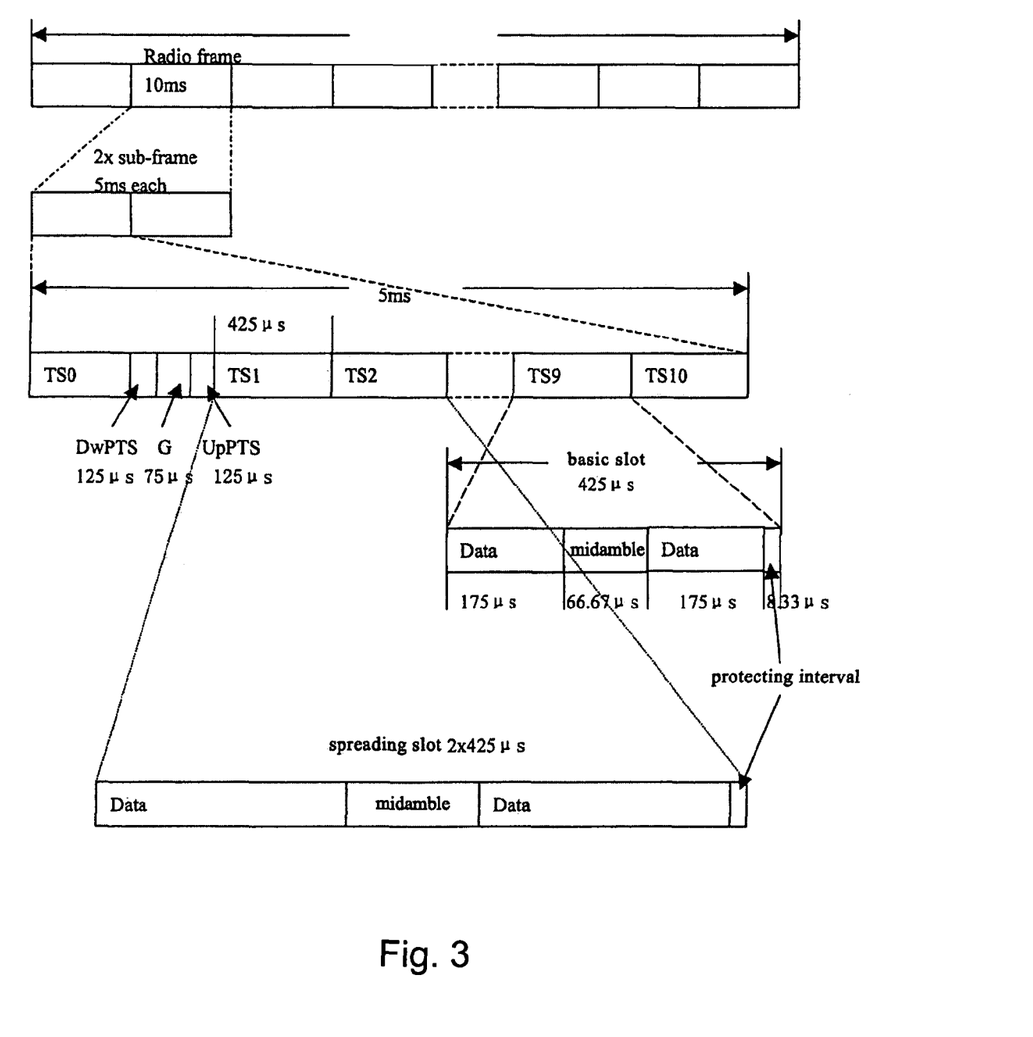
FIG. 3 is a schematic diagram showing a frame structure for a TDD mobile communication system when a carrier bandwidth is 5 MHz, 10 MHz and 20 MHz.

FIG. 3 shows a frame structure when the bandwidth is 5/10/20 MHz. One of the directions for the 3G mobile communication system development is to improve the transmitting rate of each carrier so that the bandwidth and spectrum efficiency of each carrier should be increased.

Figure 4:
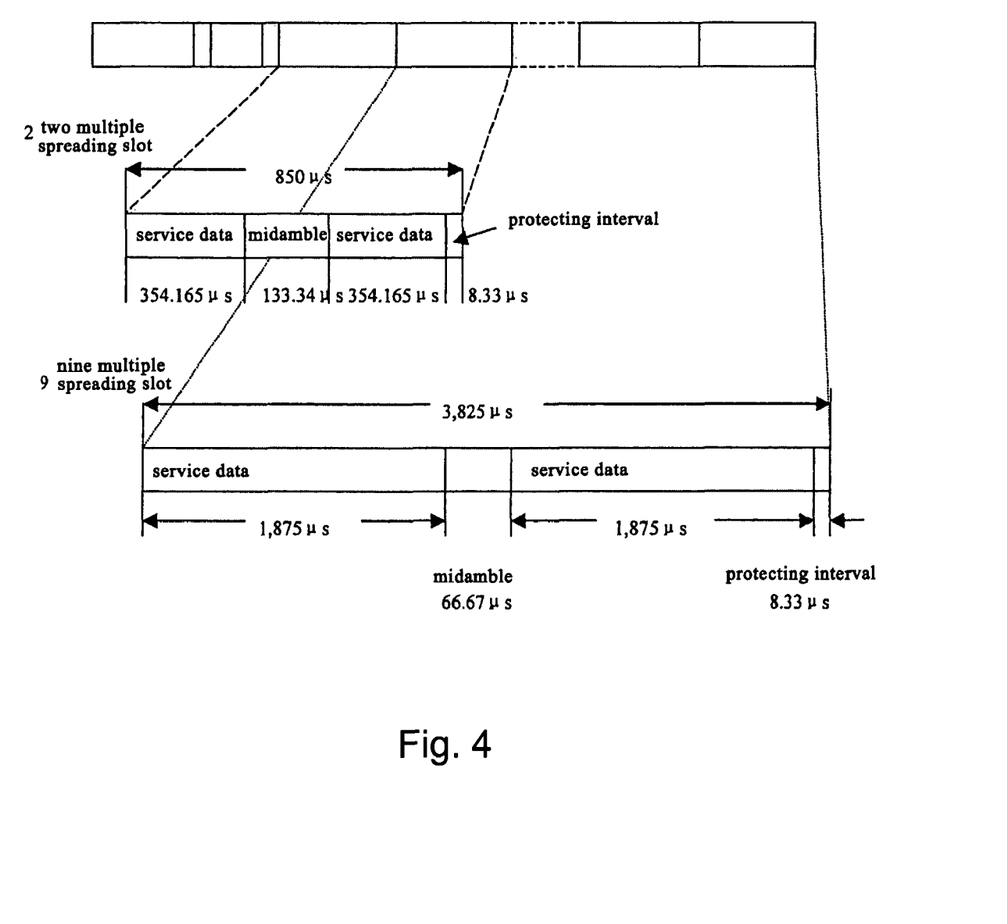
FIG. 4 is a schematic diagram showing a structure of the spreading slot shown in FIG. 3.

The present invention designs a frame structure shown in FIG. 3 and FIG. 4. Each 5 ms sub-frame is comprised of 11 basic slots TS0 to TS10 and 3 special slots and N=10. For the simplicity of illustration, suppose the length of each basic slot is the same which is 425 μs. The midamble between basic slots occupies 66.67 μs, each data area occupies 175 μs and the protecting interval occupies 8.33 μs.

A two multiple spreading slot can be constructed with the structure shown in FIG. 3 so as to support the ability of providing higher transmitting rate in a single slot. For example, a spreading slot is comprised by combining the basic slots TS1 and TS2 and the length of the spreading slot is 2×425 μs. This two multiple slot occupies 850 μs, wherein the midamble occupies 133.34 μs, each data area occupies 354.165 μs and the protecting interval occupies 8.33 μs so that 133.34+354.165+354.165+8.33=850 μs. For the detailed data, please refer to the two multiple slot structure shown in FIG. 4.

A nine multiple spreading slot can be constructed with the structure shown in FIG. 4 so as to support the ability of providing higher transmitting rate in a single slot such as for transmitting packet switch data. The nine multiple slot occupies 9×425=3,825 μs, wherein the midamble occupies 66.67 μs, each data area occupies 1,875 μs and the protecting interval occupies 8.33 μs so that 66.67+1875+1875+8.33=3,825 μs.

When the bandwidth is 5 MHz, the basic slots can be configured as follows: the midamble is of 256 bit and when the spreading coefficient is 16, each code channel data area is of 84 symbols or the maximum transmitting ability (service data+signaling, correction coding not included) under the QPSK modulation is 33.6 kbps and can transmit a voice with a coding rate of 12.2 kbps.

Each basic slot can transmit 1,344 symbols or the maximum transmitting ability (service data+signaling, correction coding not included) under the QPSK modulation is 537.6 kbps; the maximum transmitting ability (service data+signaling, correction coding not included) under the 16QAM modulation is 1.0752 Mbps; the maximum transmitting ability (service data+signaling, correction coding not included) under the 64QAM modulation is 2.1504 Mbps.

When the two basic slots are combined to one two multiple spreading slot, as shown in FIG. 4, when the spreading coefficient is 16, each code channel data area is of 170 symbols and each basic slot can transmit 2,720 symbols or the maximum transmitting ability (service data+signaling, correction coding not included) under the QPSK modulation is 1.088 Mbps; the maximum transmitting ability (service data+signaling, correction coding not included) under the 16QAM modulation is 2.176 Mbps; the maximum transmitting ability (service data+signaling, correction coding not included) under the 64QAM modulation is 4.352 Mbps.

When the nine basic slots are combined to one nine multiple spreading slot, as shown in FIG. 4, when the spreading coefficient is 16, each code channel data area is of 1,028 symbols and each basic slot can transmit 16,448 symbols or the maximum transmitting ability (service data+signaling, correction coding not included) under the QPSK modulation is 6.5792 Mbps; the maximum transmitting ability (service data+signaling, correction coding not included) under the 16QAM modulation is 13.1584 Mbps; the maximum transmitting ability (service data+signaling, correction coding not included) under the 64QAM modulation is 26.3168 Mbps.

When the bandwidth is 5 MHz, the basic slots can be configured as follows: the midamble is of 512 bit and when the spreading coefficient is 32, each code channel data area is of 84 symbols or the maximum transmitting ability (service data+signaling, correction coding not included) under the QPSK modulation is 33.6 kbps and can transmit a voice with a coding rate of 12.2 kbps. Each basic slot can transmit 2,688 symbols or the maximum transmitting ability (service data+signaling, correction coding not included) under the QPSK modulation is 1.0752 Mbps; the maximum transmitting ability (service data+signaling, correction coding not included) under the 16QAM modulation is 2.1504 Mbps; the maximum transmitting ability (service data+signaling, correction coding not included) under the 64QAM modulation is 4.3004 Mbps.

When the two basic slots are combined to one two multiple spreading slot, the two multiple slot can be configured as follows: the midamble is of 1024 bit and when the spreading coefficient is 32, each code channel data area is of 170 symbols and each basic slot can transmit 5,440 symbols or the maximum transmitting ability (service data+signaling, correction coding not included) under the QPSK modulation is 2.176 Mbps; the maximum transmitting ability (service data+signaling, correction coding not included) under the 16QAM modulation is 4.352 Mbps; the maximum transmitting ability (service data+signaling, correction coding not included) under the 64QAM modulation is 8.704 Mbps.

When the nine basic slots are combined to one nine multiple spreading slot, the nine multiple slot can be configured as follows: the midamble is of 512 bit and when the spreading coefficient is 32, each code channel data area is of 1,028 symbols and each basic slot can transmit 32,896 symbols or the maximum transmitting ability (service data+signaling, correction coding not included) under the QPSK modulation is 13.1584 Mbps; the maximum transmitting ability (service data+signaling, correction coding not included) under the 16QAM modulation is 26.3168 Mbps; the maximum transmitting ability (service data+signaling, correction coding not included) under the 64QAM modulation is 52.6336 Mbps.

When the bandwidth is 20 MHz, the basic slots can be configured as follows: the midamble is of 1024 bit and when the spreading coefficient is 64, each code channel data area is of 84 symbols or the maximum transmitting ability (service data+signaling, correction coding not included) under the QPSK modulation is 33.6 kbps and can transmit a voice with a coding rate of 12.2 kbps. Each basic slot can transmit 5,376 symbols or the maximum transmitting ability (service data+signaling, correction coding not included) under the QPSK modulation is 2.1504 Mbps; the maximum transmitting ability (service data+signaling, correction coding not included) under the 16QAM modulation is 4.3008 Mbps; the maximum transmitting ability (service data+signaling, correction coding not included) under the 64QAM modulation is 8.6016 Mbps.

When the two basic slots are combined to one two multiple spreading slot, the two multiple slot can be configured as follows: the midamble is of 2048 bit and when the spreading coefficient is 64, each code channel data area is of 170 symbols and each basic slot can transmit 10,880 symbols or the maximum transmitting ability (service data+signaling, correction coding not included) under the QPSK modulation is 4.352 Mbps; the maximum transmitting ability (service data+signaling, correction coding not included) under the 16QAM modulation is 8.704 Mbps; the maximum transmitting ability (service data+signaling, correction coding not included) under the 64QAM modulation is 17.408 Mbps.

When the nine basic slots are combined to one nine multiple spreading slot, the nine multiple slot can be configured as follows: the midamble is of 1024 bit and when the spreading coefficient is 64, each code channel data area is of 1028 symbols and each basic slot can transmit 65,792 symbols or the maximum transmitting ability (service data+signaling, correction coding not included) under the QPSK modulation is 26.3168 Mbps; the maximum transmitting ability (service data+signaling, correction coding not included) under the 16QAM modulation is 52.6336; the maximum transmitting ability (service data+signaling, correction coding not included) under the 64QAM modulation is 105.2672 Mbps.

The above examples show that with the frame structure of the present invention and in combination with different basic slot and spreading slot lengths, different modulation mode and different spreading coefficient, the transmitting ability of each channel (one code channel in a slot) in the TDD system is listed in the following table wherein the length of the basic slot is determined according to N=10.

| Service rate | Modulation mode | Spreading coefficient | Slot length | Remark |
|---|---|---|---|---|
| bandwidth = 5 MHz, chip rate = 3.84 Mcps | | | | |
| voice | QPSK | 16 | Basic slot | 12.2 kbps (R = 1/3 correction coding) |
| VoD | QPSK | 4 | Basic slot | 64 kbps (R = 1/3 correction coding) |
| 144 kbps | QPSK | 1 | Basic slot | R = 1/3 correction coding |
| 384 kbps | 16QAM | 1 | Basic slot | R = 1/3 correction coding |
| 2 Mbps | 16QAM | 1 | 2 multiple basic slot | R = 1/2 correction coding |
| 10 Mbps | 16QAM | 1 | 9 multiple basic slot | No correction coding |
| bandwidth = 10 MHz; chip rate = 7.68 Mcps | | | | |
| Voice | QPSK | 32 | Basic slot | 12.2 kbps (R = 1/3 correction coding) |
| VoD | QPSK | 8 | Basic slot | 64 kbps (R = 1/3 correction coding) |
| 144 kbps | QPSK | 4 | Basic slot | R = 1/3 correction coding |
| 384 kbps | QPSK | 1 | Basic slot | R = 1/3 correction coding |
| 2 Mbps | 16QAM | 1 | 2 multiple basic slot | R = 1/2 correction coding |
| 10 Mbps | 16QAM | 1 | 9 multiple basic slot | R = 1/2 correction coding |
| 20 Mbps | 16QAM | 1 | basic slot | No correction coding |
| bandwidth = 20 MHz; chip rate = 15.36 Mcps | | | | |
| Voice | QPSK | 64 | Basic slot | 12.2 kbps (R = 1/3 correction coding) |
| VoD | QPSK | 16 | Basic slot | 64 kbps (R = 1/3 correction coding) |
| 144 kbps | QPSK | 8 | Basic slot | R = 1/3 correction coding |
| 384 kbps | QPSK | 2 | Basic slot | R = 1/3 correction coding |
| 2 Mbps | 16QAM | 1 | Basic slot | R = 1/3 correction coding |
| 10 Mbps | 16QAM | 1 | 2 multiple basic slot | R = 1/2 correction coding |
| 100 Mbps | 64QAM | 1 | 9 multiple basic slot | No correction coding |

Parameters in the above table show that wireless transmission at different rates and different requirements can be provided by determining N, the length of the basic slot, combining the basic slots to spreading slots, adopting different modulation mode, correction coding mode and spreading coefficient in different slots; when N=10, ability of transmitting at different rates up to 100 Mbps in one code channel in a slot can be provided in the system when the system bandwidth is 5 MHz, 10 MHz or 20 MHz respectively by adjusting the modulation mode, spreading coefficient and method to constituting spreading slots (multiples of the basic slots).

Obviously, the method of the present invention is a great improvement for the TD-SCDMA system and can greatly improve the data transmission rate of the system with increasing the system complexity, and thus satisfies the requirements of the beyond 3G multimedia.

The method of the present invention can be applied in other wireless systems after being modified, such as in the wireless user loop and wireless local network (WLAN).

What is claimed is:

1. A method of wireless transmission using a high-efficiency and high-performance frame structure in a broadband TDD system, comprising:
    dividing one sub-frame into several basic slots and several special slots;

determining the number of the basic slots to determine the length of the basic slots so as to combine the basic slots into extended slots and to determine a modulation mode, a correction coding mode and a spreading coefficient used in different basic slots and extended slots so as to provide wireless transmission for services with different transmission rate and different transmission quality requirements; and using, by a transmitter in the broadband TDD system, one of the several basic slots to transmit broadcast or paging information of a cell and using, by the transmitter, the others of the several basic slots to transmit service information, wherein, part of the basic slots used to transmit service information is configured as several extended slots, wherein, each of the several extended slots is derived by combining at least two basic slots used to transmit service information;

the transmitter uses the other part of the basic slots and the several extended slots to transmit services requiring different transmission rates, respectively; and when a bandwidth of the broadband TDD system is changed, the transmitter is capable of using the other part of the basic slots and the several extended slots to transmit the services in the event that appropriate modulation modes, correction coding modes and spreading coefficients are determined for the other part of the basic slots and the several extended slots respectively, wherein adjusting the spreading coefficient and the multiple of the basic slots constituting the extended slots corresponding to one modulation mode when the number of the basic slots is fixed is able to satisfy requirements of the system for different data rate transmission abilities within 100 Mbps when the system bandwidths are 5 MHz, 10 MHz and 20 MHz respectively.

2. The method according to claim 1, wherein the basic slot or the extended slot is configured to include a midamble part used to transmit a link estimation value and synchronization holding information, and at each side of the midamble, there is configured to have one service data area for transmitting service data and one interval area for protecting the basic slots and the extended slots.

3. The method according to claim 2, wherein the interval areas between the basic slots and the interval areas between the extended slots have a same length.

4. The method according to claim 1, wherein each basic slot of the several basic slots has a same length.

5. The method according to claim 1, wherein each basic slot of the several basic slots has a different length.

6. The method according to claim 1, wherein each of the several special slots comprises a Downlink Pilot Time Slot DwPTS, an Uplink and Downlink Protecting Time Slot G, and an Uplink Pilot Time Slot UpPTS.

7. The method according to claim 1, wherein the number of the basic slots is 11 and the length of the extended slots are 2 to 9 times of those of the basic slots.

8. The method according to claim 1, wherein
the length of the basic slot is 425 μs, in which the length of the midamble part is 66.67 μs, the length of the data areas each at one side of the midamble is 175 μs, and the length of the interval area is 8.33 μs;
the length of the extended slot which is two multiple of the basic slot is 850 μs, in which the length of the midamble part is 133.34 μs, the length of the data areas each at one side of the midamble is 354.165 μs, and the length of the interval area is 8.33 μs;
the length of the extended slot which is nine multiple of the basic slot is 3825 μs, in which the length of the midamble part is 66.67 μs, the length of the data areas each at one side of the midamble is 1875 μs, and the length of the interval area is 8.33 μs.

* * * * *